United States Patent
Sar et al.

(10) Patent No.: US 11,270,258 B2
(45) Date of Patent: Mar. 8, 2022

(54) DYNAMIC INVENTORY SEGMENTATION WITH PREDICTED PREDICTION TIME WINDOW

(71) Applicant: INTERNATIONAL BUSINESS MACHINES CORPORATION, Armonk, NY (US)

(72) Inventors: Sudhanshu Sekher Sar, Bangalore (IN); Balakrishnan Rajenderan, Bengaluru (IN); Brunda Panthula, Bengaluru (IN); Layana Abraham, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 16/750,765

(22) Filed: Jan. 23, 2020

(65) Prior Publication Data
US 2021/0233012 A1    Jul. 29, 2021

(51) Int. Cl.
*G06N 20/00* (2019.01)
*G06Q 10/08* (2012.01)
(Continued)

(52) U.S. Cl.
CPC ......... *G06Q 10/087* (2013.01); *G06K 9/6256* (2013.01); *G06N 20/00* (2019.01); *G06Q 30/0204* (2013.01)

(58) Field of Classification Search
CPC ............. G06Q 10/087; G06Q 30/0204; G06K 9/6256; G06K 9/627; G06N 20/00
(Continued)

(56) References Cited

U.S. PATENT DOCUMENTS 2,533,846 A * 12/1950 Stone ............... E04F 10/08
                                            52/74
8,249,955 B2 * 8/2012 Gross ............... G06Q 10/06
                                            705/28
(Continued)

FOREIGN PATENT DOCUMENTS

GB        2533846 A * 7/2016   ......... G06Q 30/0621

OTHER PUBLICATIONS

Schaefer, "Markov Decision Processes," EWO Seminar, Oct. 26, 2006, 47 pages.
(Continued)

*Primary Examiner* — Russell S Glass
(74) *Attorney, Agent, or Firm* — Conley Rose, P.C.

(57) ABSTRACT

A machine learning system for dynamically segmenting inventory includes a memory having instructions therein, and at least one processor configured to execute the instructions to, using a reinforcement learning agent ("RLA"): determine, based at least in part on first inventory data corresponding to at least a portion of a first prediction time window for the RLA, a second prediction time window for the RLA; segment a first supply of inventory, based at least in part on the second prediction time window and at least a portion of the first inventory data; determine, based at least in part on second inventory data corresponding to at least a portion of the second prediction time window, a third prediction time window for the RLA; and segment a second supply of inventory, based at least in part on the third prediction time window and at least a portion of the second inventory data.

20 Claims, 5 Drawing Sheets

(51) Int. Cl.
*G06K 9/62* (2022.01)
*G06Q 30/02* (2012.01)

(58) Field of Classification Search
USPC .......................................................... 705/28
See application file for complete search history.

(56) References Cited

U.S. PATENT DOCUMENTS

| | | |
|---|---|---|
| 2014/0249884 A1 | 9/2014 | Hong et al. |
| 2015/0302318 A1 | 10/2015 | Chen et al. |
| 2017/0278053 A1 | 9/2017 | High et al. |
| 2018/0060990 A1 | 3/2018 | Liu |
| 2018/0247256 A1* | 8/2018 | Takigawa .................. H01S 3/23 |
| 2019/0244230 A1* | 8/2019 | Subramanian ......... G06Q 10/02 |
| 2021/0158271 A1* | 5/2021 | Cook .................... G06Q 10/087 |

OTHER PUBLICATIONS

DSD Business Systems, "Why Is Inventory Management Important?", Blog, https://www.dsdinc.com/2017/04/18/why-is-inventory-management-important/, Oct. 29, 2019, 3 pages.

\* cited by examiner

DYNAMIC INVENTORY SEGMENTATION WITH PREDICTED PREDICTION TIME WINDOW

BACKGROUND

The present disclosure relates generally to the fields of inventory management and artificial intelligence.

Historically, inventory segmentation has been an aspect of inventory management that has involved divvying up supplies of goods across categorized distribution bins or channels to more effectively meet various demands for the goods. Meanwhile, various abilities of machines to acquire and apply knowledge and skills have been categorized as artificial intelligence ("AI"). Machine learning has been considered to be a form of AI. Machine learning has employed algorithms and statistical models that have enabled computer systems use to perform tasks without using explicit instructions, relying on patterns and inferences instead. Supervised learning has been an area of machine learning concerned with employing mathematical models based on sample data (i.e., "training data") that has been generated as a result of environmental responses to known stimuli (i.e., "input data"). Reinforcement learning has been an area of machine learning concerned with developing and using machines, typically referred to as "agents," to operate in or on an environment so as to maximize some notion of cumulative reward. Unlike supervised learning, reinforcement learning has typically not relied on labelled input/output pairs or explicit corrections of sub-optimal actions. Instead, reinforcement learning has typically focused on finding balances between explorations of uncharted territory and exploitations of current knowledge.

SUMMARY

A machine learning method for dynamically segmenting inventory is disclosed. The method includes determining, using a reinforcement learning agent, based at least in part on first inventory data corresponding to at least a portion of a first prediction time window for the reinforcement learning agent, a second prediction time window for the reinforcement learning agent. The method also includes segmenting a first supply of inventory, using the reinforcement learning agent, based at least in part on the second prediction time window and at least a portion of the first inventory data. The method also includes determining, using the reinforcement learning agent, based at least in part on second inventory data corresponding to at least a portion of the second prediction time window, a third prediction time window for the reinforcement learning agent. The method also includes segmenting a second supply of inventory, using the reinforcement learning agent, based at least in part on the third prediction time window and at least a portion of the second inventory data.

A machine learning system for dynamically segmenting inventory is also disclosed. The system includes a memory having instructions therein and at least one processor in communication with the memory. The at least one processor is configured to execute the instructions to determine, using a reinforcement learning agent, based at least in part on first inventory data corresponding to at least a portion of a first prediction time window for the reinforcement learning agent, a second prediction time window for the reinforcement learning agent. The at least one processor is also configured to execute the instructions to segment a first supply of inventory, using the reinforcement learning agent, based at least in part on the second prediction time window and at least a portion of the first inventory data. The at least one processor is also configured to execute the instructions to determine, using the reinforcement learning agent, based at least in part on second inventory data corresponding to at least a portion of the second prediction time window, a third prediction time window for the reinforcement learning agent. The at least one processor is also configured to execute the instructions to segment a second supply of inventory, using the reinforcement learning agent, based at least in part on the third prediction time window and at least a portion of the second inventory data.

A computer program product for machine learning dynamic inventory segmentation is also disclosed. The computer program product includes a computer readable storage medium having program instructions embodied therewith. The program instructions are executable by at least one processor to cause the at least one processor to determine, using a reinforcement learning agent, based at least in part on first inventory data corresponding to at least a portion of a first prediction time window for the reinforcement learning agent, a second prediction time window for the reinforcement learning agent. The program instructions are also executable by the at least one processor to cause the at least one processor to segment a first supply of inventory, using the reinforcement learning agent, based at least in part on the second prediction time window and at least a portion of the first inventory data. The program instructions are also executable by the at least one processor to cause the at least one processor to determine, using the reinforcement learning agent, based at least in part on second inventory data corresponding to at least a portion of the second prediction time window, a third prediction time window for the reinforcement learning agent. The program instructions are also executable by the at least one processor to cause the at least one processor to segment a second supply of inventory, using the reinforcement learning agent, based at least in part on the third prediction time window and at least a portion of the second inventory data.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

For many businesses, the importance of inventory management cannot be overstated:

Inventory management can make or break a business. Inventory is often the largest item in the current assets category on a balance sheet. Issues with inventory can contribute to business losses, even failures. Proper management of the supply chain, on the other hand, can allow a business to thrive. Good inventory management strikes a balance between the amount of inventory coming in and going out. It controls the timing and costs of non-capitalized assets and stock items, allowing a business to reach optimal profitability.

Why Is Inventory Management Important?, DSD Business Systems, Apr. 18, 2017, published at https://www.dsdinc.com/2017/04/18/why-is-inventory-management-important/.

Aspects of the present disclosure provide dynamic segmentation (or divvying up) of sequential supplies of inventory. As described further below, a reinforcement learning agent ("RLA") may use various supply-side data (e.g., types of incoming inventory, relative importance or weights of such inventory, etc.) and various demand-side data (e.g., respective customer demands for the inventory, relative demand priorities, etc.) to control an inventory segmentation process. The RLA may direct a sorting subsystem to segment (or divvy up) the inventory supplies into a plurality of segments. The segments may correspond to respective distribution channels and/or associated holding bins. Between decision epochs, the RLA may predict (based on the current performance of the process) a best prediction time for optimizing the next segmentation.

As used within the written disclosure and in the claims, the terms "including" and "comprising" (and inflections thereof) are used in an open-ended fashion, and thus should be interpreted to mean "including, but not limited to." Unless otherwise indicated, as used throughout this document, "or" does not require mutual exclusivity, and the singular forms "a," "an," and "the" are intended to include the plural forms as well, unless the context clearly indicates otherwise.

A "module" or "unit" (and inflections thereof) as referenced herein comprises one or more hardware or electrical components such as electrical circuitry, processors, and memory that may be specially configured to perform a particular function. The memory may comprise volatile memory or non-volatile memory that stores data such as, but not limited to, computer executable instructions, machine code, and other various forms of data. The module or unit may be configured to use the data to execute one or more instructions to perform one or more tasks. In certain instances, a module or unit may also refer to a particular set of functions, software instructions, or circuitry that is configured to perform a specific task. For example, a module or unit may comprise software components such as, but not limited to, data access objects, service components, user interface components, application programming interface ("API") components; hardware components such as electrical circuitry, processors, and memory; and/or a combination thereof. As referenced herein, computer executable instructions may be in any form including, but not limited to, machine code, assembly code, and high-level programming code written in any programming language.

Also, as used herein, the term "communicate" (and inflections thereof) means to receive and/or transmit data or information over a communication link. The communication link may include both wired and wireless links, and may comprise a direct link or may comprise multiple links passing through one or more communication networks or network devices such as, but not limited to, routers, firewalls, servers, and switches. The communication networks may comprise any type of wired or wireless network. The networks may include private networks and/or public networks such as the Internet. Additionally, in some embodiments, the term communicate may also encompass internal communication between various components of a system and/or with an external input/output device such as a keyboard or display device.

Figure 1:
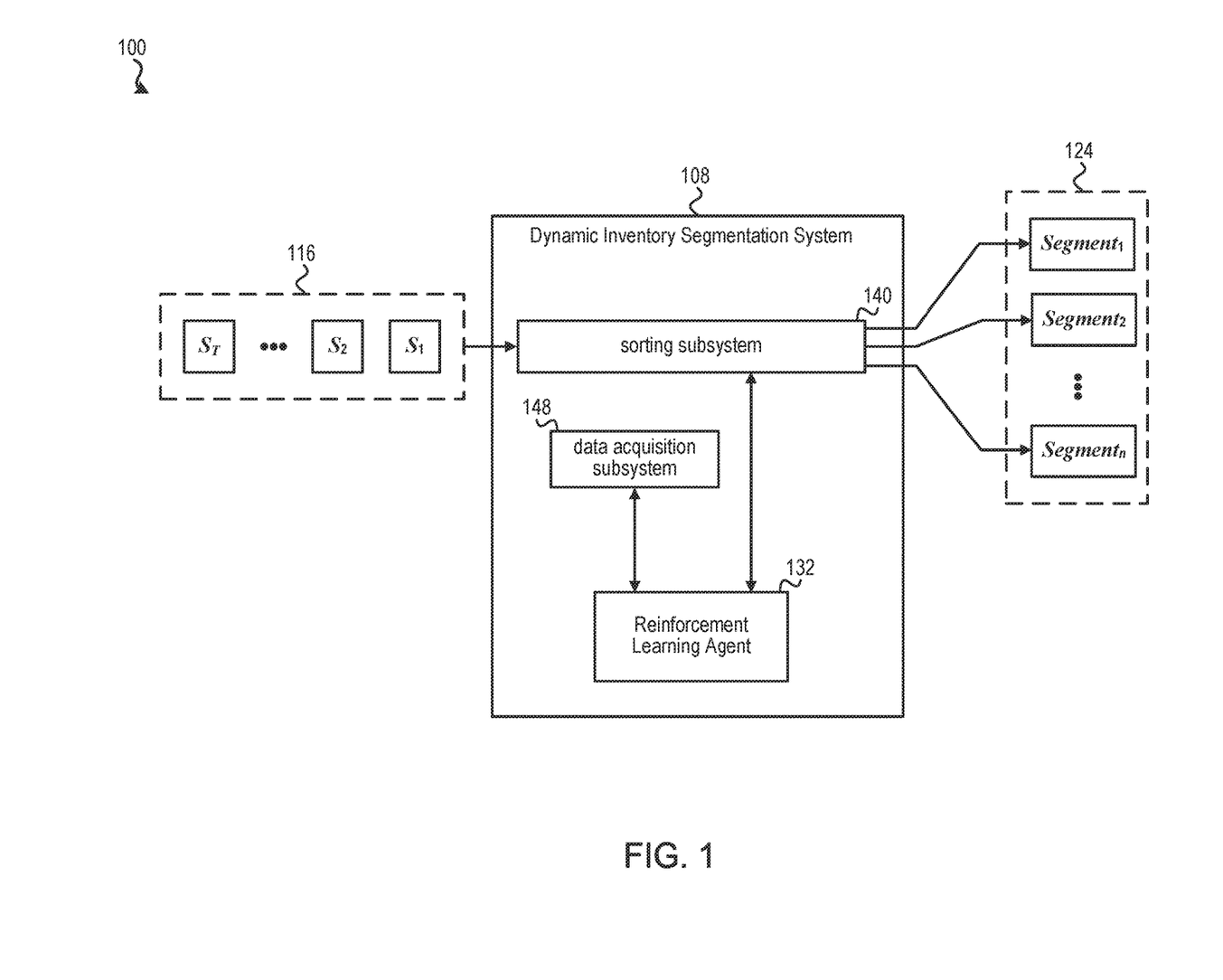
FIG. 1 is a block diagram illustration of a dynamic inventory segmentation environment in accordance with aspects of the present disclosure.

FIG. 1 is a block diagram illustration of a dynamic inventory segmentation environment 100 in accordance with aspects of the present disclosure. The environment 100 includes a dynamic inventory segmentation system 108. In general, the system 108 is configured to segment each of sequential supplies of inventory 116 into a respective plurality of segments 124. More particularly, the system 108 is configured to implement a reinforcement learning inventory segmentation process 200 in accordance with aspects of the present disclosure (the process 200 per se is not explicitly illustrated in FIG. 1, but see FIG. 2).

The system 108 comprises a reinforcement learning agent ("RLA") 132. In some instances, the RLA 132 may comprise one or more model-free reinforcement learning engines implemented in the data processing system 400 (the data processing system 400 per se is not explicitly illustrated in FIG. 1, but see FIG. 4). Non-limiting examples of suitable model-free reinforcement learning engines include a deep Q network ("DQN"), a double deep Q network ("DDQN"), a dueling double deep Q network ("Dueling DDQN"), and asynchronous advantage actor-critic agents ("A3C"). In other instances, the reinforcement learning agent may comprise any other suitable data processing system(s), model-free reinforcement learning engine(s), and/or model-based reinforcement learning engine(s). The RLA 132 is described further below in connection with the process 200 (the process 200 per se is not explicitly illustrated in FIG. 1, but see FIG. 2).

The system 108 also comprises a sorting subsystem 140. The sorting subsystem 140 is communicatively coupled to the RLA 132. The sorting subsystem 140 is configured to physically divvy each of the sequential supplies of inventory 116 into the respective plurality of segments 124 according to control commands or instructions from the RLA 132. In some instances, the sorting subsystem 140 may comprise the data processing system 400 and any other suitable components (the data processing system 400 per se is not explicitly illustrated in FIG. 1, but see FIG. 4). In other instances, the sorting subsystem 140 may comprise any other suitable system(s) and/or other components(s).

The system 108 also comprises a data acquisition subsystem 148. The data acquisition subsystem 148 is communicatively coupled to the RLA 132. The data acquisition subsystem 148 is described further below in connection with the process 200 (the process 200 per se is not explicitly illustrated in FIG. 1, but see FIG. 2).

Figure 2:
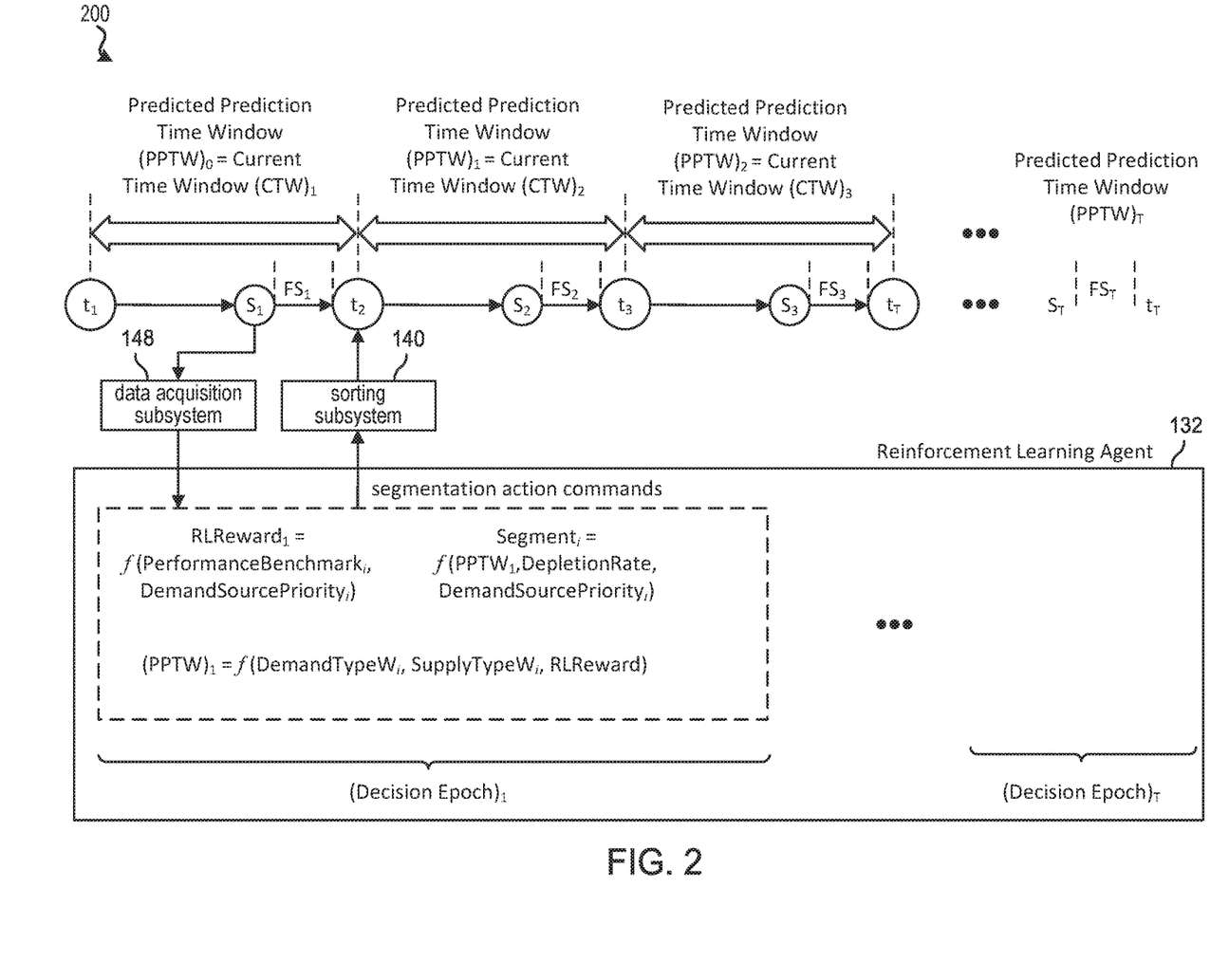
FIG. 2 is a process flow diagram illustration of a reinforcement learning inventory segmentation process in accordance with aspects of the present disclosure.

FIG. 2 is a process flow diagram illustration of the reinforcement learning inventory segmentation process 200.

Figure 4:
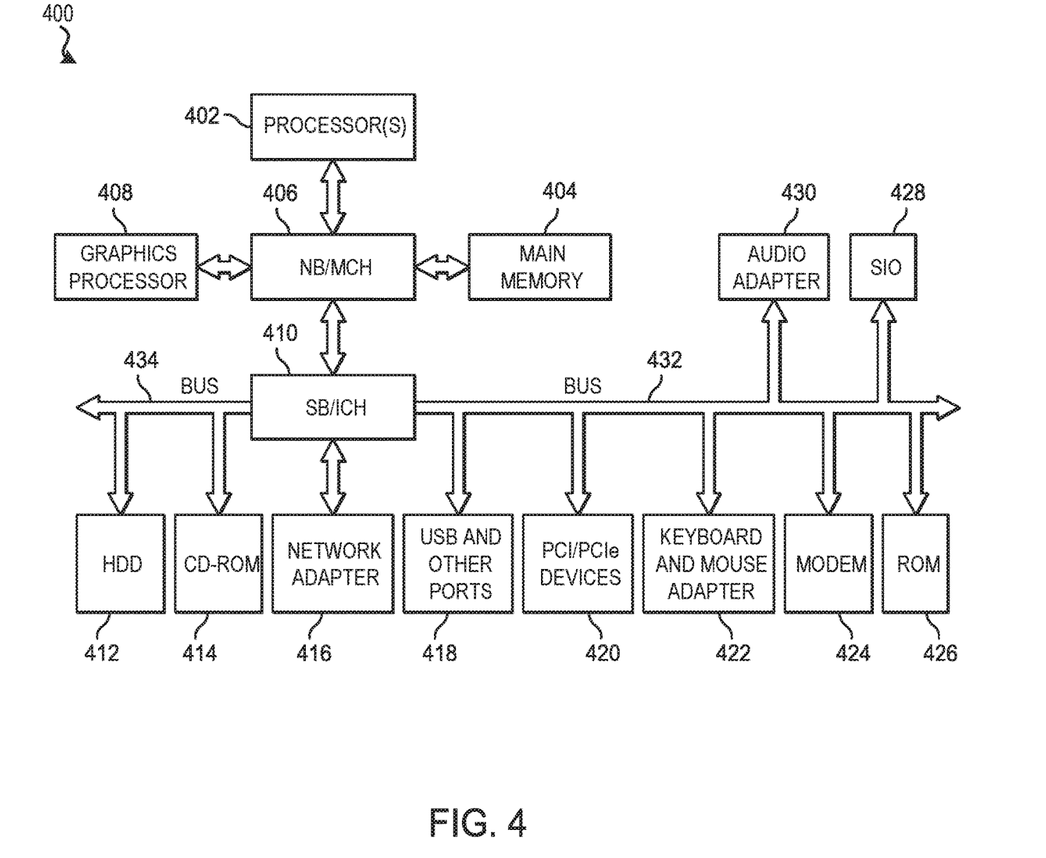
FIG. 4 is a block diagram illustration of a hardware architecture of a data processing system in accordance with aspects of the present disclosure.

In some instances, one or more steps of the process 200 may be performed by the data processing system 400 (the data processing system 400 per se is not explicitly illustrated in FIG. 2, but see FIG. 4). Nevertheless, it should be appreciated that the process 200 and/or any one or more of its particular steps may be performed by any suitable system(s), component(s), method(s), and/or process(es). It should also be appreciated that the process 200 may be performed concurrently or substantially concurrently with any other method(s) and/or process(es) described herein.

The process 200 uses, among other things, the reinforcement learning agent ("RLA") 132. The RLA 132 is configured to control (as described further below) the segmenting of each sequential current supply, $S_k$, of a variable inventory into a number, n, of segments (not explicitly shown), for all k from decision epochs 1 to T (i.e., such that each $S_k = \Sigma_{i=1}^n$ Segment$_i$, where each Segment$_i$ represents one of the n segments and where $S_k = S_1, S_2, S_3, \ldots S_T$ at decision epochs 1, 2, 3, ... T, respectively).

The data acquisition subsystem 148 (which is communicatively coupled to the RLA 132) is configured to monitor one or more inventory supply sources and one or more inventory demand sources for each Segment$_i$ of the current supply, $S_k$, of inventory. Further, the data acquisition subsystem 148 is configured to determine each of sequential reinforcement learning rewards ("RLReward$_k$") for the RLA 132 based on a respective performance benchmark ("PerformanceBenchmark$_i$") and a respective relative demand source priority ("DemandSourcePriority$_1$") for each Segment$_i$ of the current supply, $S_k$, of inventory. In some instances, the data acquisition subsystem 148 may comprise the data processing system 400 and any other suitable components (the data processing system 400 per se is not explicitly illustrated in FIG. 2, but see FIG. 4). In other instances, the data acquisition subsystem 148 may comprise any other suitable data processing system(s) and/or other components(s).

At some amount of time, $FS_k$, before each k-th decision epoch (i.e., before the end of the current prediction time window for the RLA 132), the data acquisition subsystem 148 determines the respective reinforcement learning reward, RLReward$_k$, and communicates that reinforcement learning reward, RLReward$_k$, to the RLA 132. In some embodiments, the data acquisition subsystem 148 may determine the amount of time, $FS_k$, based on the time size of the current prediction time window for the RLA 132. In some such embodiments, the data acquisition subsystem 148 may determine $FS_k$ such that $FS_k = (CPTW_k)/x$, where "$CPTW_k$" represents the time size of the current prediction time window and x represents a predetermined number in the range of 10 to 15, inclusive. In other embodiments, the data acquisition subsystem 148 may determine the amount of time, $FS_k$, based on one or more other suitable criteria (and/or in any other suitable manner) or the amount of time, $FS_k$, may be a suitable predetermined constant.

Upon receiving each reinforcement learning reward, RLReward$_k$ (at the amount of time, $FS_k$, before each respective k-th decision epoch), the RLA 132 predicts a respective best next prediction time window size (i.e., the RLA 132 determines a predicted prediction time window, "PPTW") for optimally segmenting the next supply, $S_{k+1}$, of inventory at the next (upcoming) decision epoch.

At each k-th decision epoch, the RLA 132 generates one or more inventory segmentation action commands (which the RLA 132 communicates to the sorting subsystem 140) such that each Segment$_i$ of the current supply, $S_k$, of inventory is based on the predicted prediction time window, PPTW, is further based on an inventory depletion rate ("DepletionRate$_i$") for the corresponding Segment$_i$ of the previous supply, $S_{k+1}$, over the time between the commencement of the previous decision epoch and the determination of the previous reinforcement learning reward, RLReward$_{k-1}$, and is further based on the relative demand source priority, DemandSourcePriority$_i$, for that Segment$_i$.

Figure 3A:
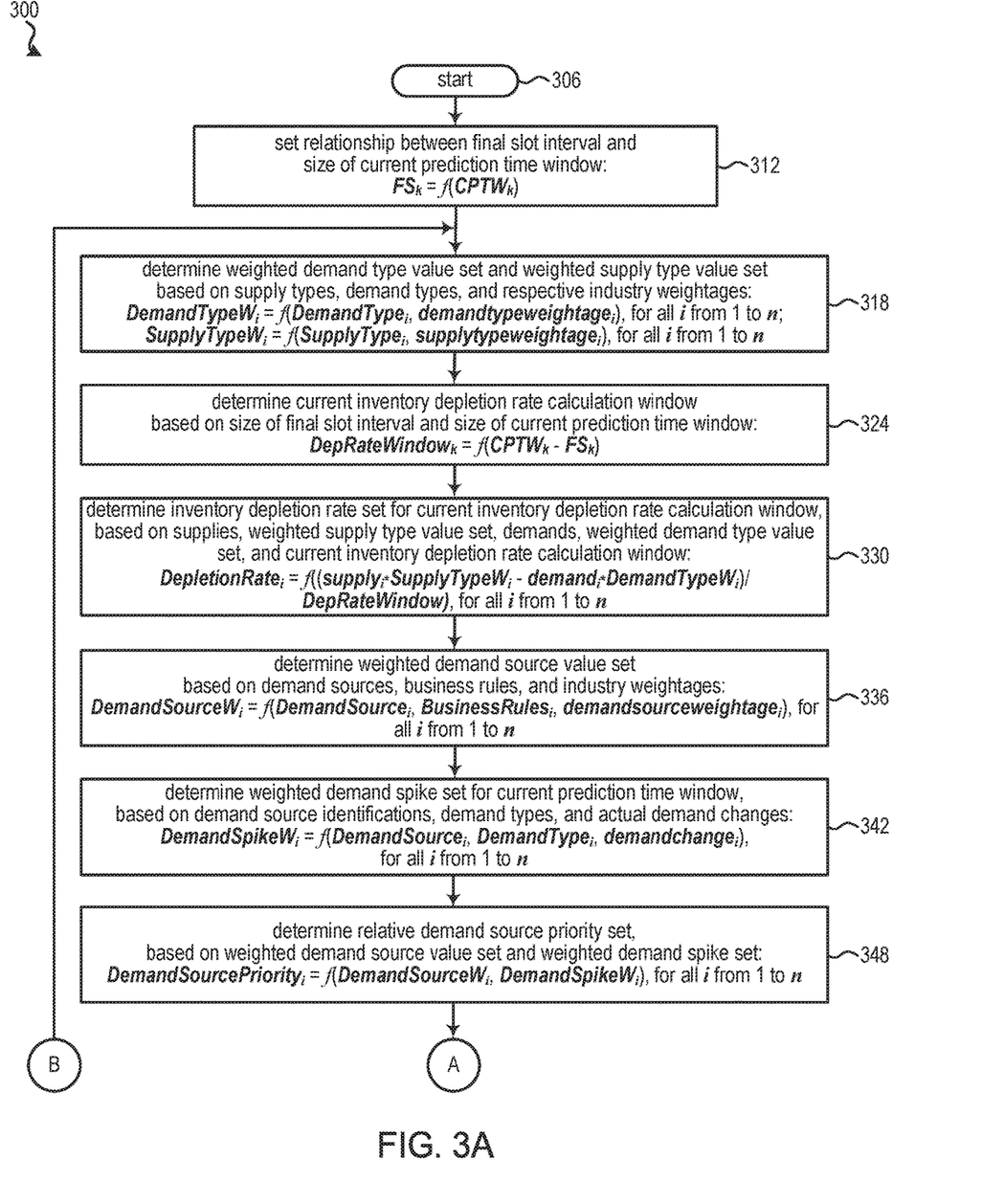
FIG. 3A-3B are a flowchart illustration of the process of FIG. 2.
Figure 3B:
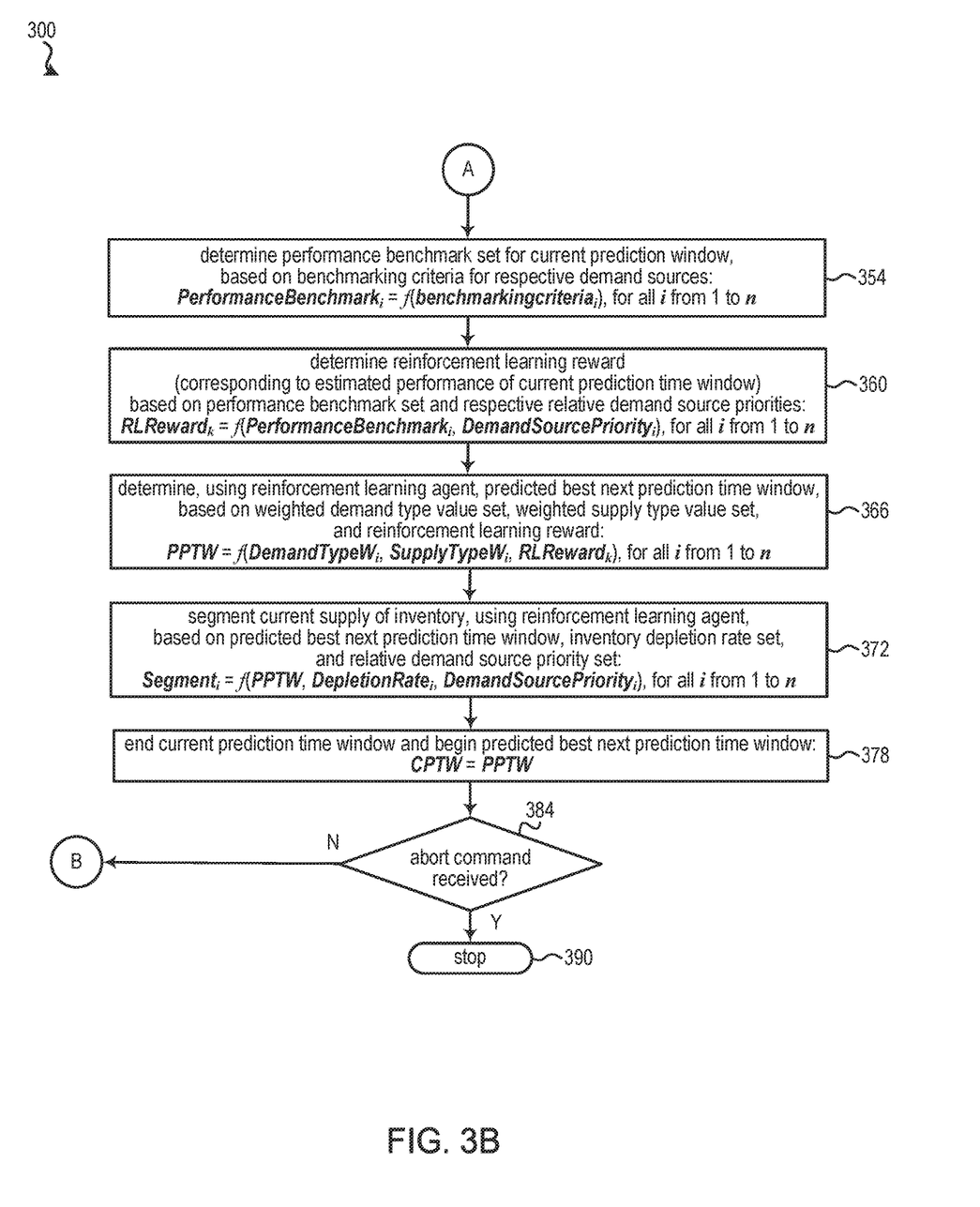

FIG. 3A-3B are a flowchart illustration of the process 200. Referring first to FIG. 3A, the process 200 starts up at step 306. Here, it should be appreciated that in some instances the RLA 132 may begin the process 200 with learning retained from one or more previous executions of the process 200 (including a corresponding initial current time window that equals the last predicted prediction time window from the previous execution of the process 200). Alternatively, in some instances the RLA 132 may be initialized with suitable predetermined initialization settings (including a suitable predetermined initial prediction time window). Either way, from step 306 the process goes to (and continues at) step 312.

At step 312, the process 200 sets the relationship between the time size of each respective current prediction time window for the RLA 132, $CPTW_k$, and each amount of time, $FS_k$, before each k-th decision epoch (i.e., each amount of time before the end of the current prediction time window) that the data acquisition subsystem 148 will determine the respective reinforcement learning reward, RLReward$_k$. As depicted in FIG. 3A, the process 200 may let $FS_k$ be any suitable function of $CPTW_k$ (i.e., the process 200 may let $FS_k$ be based on $CPTW_k$ and in any suitable manner). In other embodiments, the process 200 may let $FS_k$ be a suitable predetermined constant. From step 312, the process goes to (and continues at) step 318.

At step 318, the process 200 determines a weighted demand type value set and weighted supply type value set based on the respective supply types, the respective demand types, and the respective industry weightages for each Segment$_i$ of the current supply, $S_k$, of inventory. Stated another way, at step 318 the process 200 determines each weighted demand type value ("DemandTypeW$_i$") as a suitable function of the respective demand type ("DemandType$_i$") and the respective demand type weightage ("demandtypeweightage$_i$"), for all i from 1 to n, and the process 200 determines each weighted supply type value ("SupplyTypeW$_i$") as a suitable function of the respective supply type ("SupplyType$_i$") and the respective supply type weightage ("supplytypeweightage$_i$"), for all i from 1 to n, where i denotes each respective segment of the current supply, $S_k$, of inventory and where n represents the number of segments. From step 318, the process goes to (and continues at) step 324.

At step 324, the process 200 determines a current inventory depletion rate calculation window based on the amount of time, $FS_k$, and the size of the current prediction time window. Stated another way, at step 324 the process 200 determines the current inventory depletion rate calculation window ("DepRateWindow$_k$") as a suitable function of the current prediction time window ("$CPTW_k$") and the amount of time, $FS_k$. As depicted in FIG. 3A, in some embodiments the process 200 may determine DepRateWindow$_k$ as a suitable function of the mathematical difference between $CPTW_k$ and $FS_k$. From step 324, the process goes to (and continues at) step 330.

At step 330, the process 200 determines an inventory depletion rate set for the current inventory depletion rate calculation window, based on respective supplies, the weighted supply type value set, respective demands, the weighted demand type value set, and the current inventory depletion rate calculation window. Stated another way, at step 330 the process 200 determines each inventory depletion rate, $DepletionRate_1$, of the inventory depletion rate set for the current inventory depletion rate calculation window as a suitable function of each respective supply ("$supply_i$"), each respective weighted supply type value, $SupplyTypeW_i$, each respective demand ("$demand_i$"), each respective weighted demand type value, $DemandTypeW_i$, and the current inventory depletion rate calculation window, $DepRateWindow_k$, for all i from 1 to n, where i denotes each respective segment of the current supply, $S_k$, of inventory and where n represents the number of segments. As depicted in FIG. 3A, in some embodiments the process 200 may determine each inventory depletion rate, $DepletionRate_i$, as a suitable function of the mathematical difference between each $(supply_i * SupplyTypeW_i)/DepRateWindow_k$ and $(demand_i * DemandTypeW_i)/DepRateWindow_k$. From step 330, the process goes to (and continues at) step 336.

At step 336, the process 200 determines a weighted demand source value set based on respective demand sources, respective business rules, and respective industry weightages. Stated another way, at step 336 the process 200 determines each weighted demand source value ("$DemandSourceW_i$") as a suitable function of the respective demand source ("$DemandSource_i$"), respective predetermined business rules ("$BusinessRules_i$"), and respective predetermined demand source weightage ("$demandsourceweightage_i$"), for all i from 1 to n, where i denotes each respective segment of the current supply, $S_k$, of inventory and where n represents the number of segments. From step 336, the process goes to (and continues at) step 342.

At step 342, the process 200 determines a weighted demand spike set for current prediction time window, based on demand source identifications, respective demand types, and respective actual demand changes. Stated another way, at step 342 the process 200 determines each weighted demand spike ("$DemandSpikeW_i$") as a suitable function of each respective demand source, $DemandSource_i$, each respective demand type, $DemandType_i$, and each respective change in demand ("$demandchange_i$"), for all i from 1 to n, where i denotes each respective segment of the current supply, $S_k$, of inventory and where n represents the number of segments. From step 342, the process goes to (and continues at) step 348.

At step 348, the process 200 determines a relative demand source priority set, based on the weighted demand source value set and the weighted demand spike set. Stated another way, at step 348 the process 200 determines each relative demand source priority, $DemandSourcePriority_i$, as a suitable function of each respective weighted demand source value, $DemandSoureW_i$, and each respective weighted demand spike, $DemandSpikeW_i$, for all i from 1 to n, where i denotes each respective segment of the current supply, $S_k$, of inventory and where n represents the number of segments. From step 348, the process goes to (and continues at) step 354.

Next, referring to FIG. 3B, at step 354 the process 200 determines a performance benchmark set for the current prediction window, based on benchmarking criteria for the respective demand sources. Stated another way, at step 354 the process 200 determines each performance benchmark ("$PerformanceBenchmark_i$") as a suitable function of suitable respective benchmarking criteria ("$benchmarkingcriteria_i$"), for all i from 1 to n, where i denotes each respective segment of the current supply, $S_k$, of inventory and where n represents the number of segments. It should be appreciated that the RLA 132 may generate the respective benchmarking criteria. From step 354, the process goes to (and continues at) step 360.

At step 360, the process 200 determines the reinforcement learning reward, $RLReward_k$, based on the performance benchmark set and the respective relative demand source priorities. Stated another way, at step 360 the process 200 determines the reinforcement learning reward, $RLReward_k$, as a suitable function of an aggregation of each $PerformanceBenchmark_i$ and an aggregation of each $DemandSourcePriority_i$, for all i from 1 to n, where i denotes each respective segment of the current supply, $S_k$, of inventory and where n represents the number of segments. Here, it should be appreciated that the reinforcement learning reward, $RLReward_k$, corresponds to estimated performance of current prediction time window. From step 360, the process goes to (and continues at) step 366.

At step 366, the process 200 determines, using the RLA 132, the predicted best next prediction time window, based on the weighted demand type value set, the weighted supply type value set, and the reinforcement learning reward. Stated another way, at step 366 the process 200 determines the predicted best next prediction time window, PPTW, as a suitable function of, for all i from 1 to n, where i denotes each respective segment of the current supply, $S_k$, of inventory and where n represents the number of segments: 1.) an aggregation of each weighted demand type value, $DemandTypeW_i$; 2.) an aggregation of each weighted supply type value, $SupplyTypeW_i$; and 3.) the reinforcement learning reward, $RLReward_k$. From step 366, the process goes to (and continues at) step 372.

At step 372, the process 200 segments the current supply, $S_k$, of inventory, using the RLA 132, based on the predicted best next prediction time window, PPTW, the inventory depletion rate set, and relative demand source priority set. Stated another way, at step 372 the process 200, using the RLA 132, generates inventory segmentation commands such that each segment, $Segment_1$, of the current supply, $S_k$, of inventory, is a suitable function of the predicted best next prediction time window, PPTW, each respective inventory depletion rate, $DepletionRate_1$, and each respective relative demand source priority, $DemandSourcePriority_i$, for all i from 1 to n, where i denotes each respective segment of the current supply, $S_k$, of inventory and where n represents the number of segments. From step 372, the process goes to (and continues at) step 378.

At step 378, the process 200 reaches the end of the current prediction time window and transitions to the coinciding beginning of the predicted best next prediction time window. From step 378, the process goes to (and continues at) step 384.

At step 384, the process 200 determines whether the process 200 has received an abort command from a human operator or other external source. If the process 200 determines that the process 200 has indeed received an abort command, then the process 200 goes to (and stops at) step 390; otherwise, the process 200 goes back to (and continues again at) step 318.

FIG. 4 is a block diagram illustration of a hardware architecture of a data processing system 400 in accordance with aspects of the present disclosure. In some embodiments, the data processing system 400 may be configured to store and execute one or more instructions for performing one or more steps of the process 200 and/or any other methods and/or processes described herein.

The data processing system 400 employs a hub architecture including north bridge and memory controller hub ("NB/MCH") 406 and south bridge and input/output ("I/O") controller hub ("SB/ICH") 410. Processor(s) 402, main memory 404, and graphics processor 408 are connected to NB/MCH 406. Graphics processor 408 may be connected to NB/MCH 406 through an accelerated graphics port ("AGP"). A computer bus, such as bus 432 or bus 434, may be implemented using any type of communication fabric or architecture that provides for a transfer of data between different components or devices attached to the fabric or architecture.

Network adapter 416 connects to SB/ICH 410. Audio adapter 430, keyboard and mouse adapter 422, modem 424, read-only memory ("ROM") 426, hard disk drive ("HDD") 412, compact disk read-only memory ("CD-ROM") drive 414, universal serial bus ("USB") ports and other communication ports 418, and peripheral component interconnect/peripheral component interconnect express ("PCI/PCIe") devices 420 connect to SB/ICH 410 through bus 432 and bus 434. PCI/PCIe devices may include, for example, Ethernet adapters, add-in cards, and personal computing ("PC") cards for notebook computers. PCI uses a card bus controller, while PCIe does not. ROM 426 may comprise, for example, a flash basic input/output system ("BIOS"). Modem 424 or network adapter 416 may be used to transmit and receive data over a network.

HDD 412 and CD-ROM drive 414 connect to SB/ICH 410 through bus 434. HDD 412 and CD-ROM drive 414 may use, for example, an integrated drive electronics ("IDE") or serial advanced technology attachment ("SATA") interface. In some embodiments, the HDD 412 may be replaced by other forms of data storage devices including, but not limited to, solid-state drives ("SSDs"). A super I/O ("SIO") device 428 may be connected to SB/ICH 410. SIO device 428 may comprise a chip on the motherboard that is configured to assist in performing less demanding controller functions for the SB/ICH 410 such as controlling a printer port, controlling a fan, and/or controlling the small light emitting diodes ("LEDS") of the data processing system 400.

The data processing system 400 may include a single processor 402 or may include a plurality of processors 402. Additionally, processor(s) 402 may have multiple cores. In some embodiments, data processing system 400 may employ a large number of processors 402 that include hundreds or thousands of processor cores. In some embodiments, the processors 402 may be configured to perform a set of coordinated computations in parallel.

An operating system is executed on the data processing system 400 using the processor(s) 402. The operating system coordinates and provides control of various components within the data processing system 400. Various applications and services may run in conjunction with the operating system. Instructions for the operating system, applications, and other data are located on storage devices, such as one or more of the HDD 412, and may be loaded into main memory 404 for execution by processor(s) 402. In some embodiments, additional instructions or data may be stored on one or more external devices. The processes described herein for the illustrative embodiments may be performed by processor(s) 402 using computer usable program code, which may be located in a memory such as, for example, main memory 404, ROM 426, or in one or more peripheral devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In accordance with aspects of the present disclosure, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A machine learning method for dynamically segmenting inventory, comprising:
   determining, using a reinforcement learning agent, based at least in part on first inventory data corresponding to at least a portion of a first prediction time window for the reinforcement learning agent, a second prediction time window for the reinforcement learning agent;
   segmenting a first supply of inventory, using the reinforcement learning agent, based at least in part on the second prediction time window and at least a portion of the first inventory data;
   determining, using the reinforcement learning agent, based at least in part on second inventory data corresponding to at least a portion of the second prediction time window, a third prediction time window for the reinforcement learning agent; and
   segmenting a second supply of inventory, using the reinforcement learning agent, based at least in part on the third prediction time window and at least a portion of the second inventory data.

2. The method of claim 1, wherein segmenting the first supply of inventory comprises:
   determining, based at least in part on a first weighted demand type value set and a first weighted supply type value set, a first inventory availability depletion rate set corresponding to at least the portion of the first prediction time window;
   determining a first relative demand source priority set based at least in part on respective demand data corresponding to the first prediction time window;
   determining a first performance benchmark set corresponding to how effectively at least one supply of inventory has been, using the reinforcement learning agent, segmented;
   determining a first reinforcement learning reward for the reinforcement learning agent based at least in part on the first performance benchmark set and the first relative demand source priority set; and
   segmenting the first supply of inventory, using the reinforcement learning agent, based at least in part on the second prediction time window, the first inventory availability depletion rate set, and the first relative demand source priority set.

3. The method of claim 2, wherein segmenting the second supply of inventory comprises:
   determining a second inventory availability depletion rate set corresponding to the second prediction time window;
   determining a second relative demand source priority set based at least in part on respective demand data corresponding to the second prediction time window;
   determining a second performance benchmark set corresponding to how effectively at least one supply of inventory has been, using the reinforcement learning agent, segmented;
   determining a second reinforcement learning reward for the reinforcement learning agent based at least in part on the second performance benchmark set and the second relative demand source priority set; and segmenting the second supply of inventory, using the reinforcement learning agent, based at least in part on the second inventory availability depletion rate set and the second relative demand source priority set.

4. The method of claim 3, wherein segmenting the first supply of inventory occurs, at least practically, at an end of the first prediction time window, wherein the end of the first prediction time window coincides, at least practically, with a beginning of the second prediction time window, and wherein determining the first inventory availability depletion rate set begins at an amount of time prior to the end of the first prediction time window.

5. The method of claim 4, wherein the amount of time is $1/15$ to $1/10$ as large as the first prediction time window.

6. The method of claim 3, wherein determining the first relative demand source priority set comprises determining the first relative demand source priority set based at least in part on a plurality of weighted demand source values and a plurality of respective demand spike values.

7. The method of claim 6, wherein the plurality of weighted demand source values corresponds to respective inventory distribution channels.

8. The method of claim 6, wherein the plurality of weighted demand source values corresponds to respective inventory delivery geographic regions.

9. A machine learning system for dynamically segmenting inventory, comprising:
a memory having instructions therein; and
at least one processor in communication with the memory, wherein the at least one processor is configured to execute the instructions to:
determine, using a reinforcement learning agent, based at least in part on first inventory data corresponding to at least a portion of a first prediction time window for the reinforcement learning agent, a second prediction time window for the reinforcement learning agent;
segment a first supply of inventory, using the reinforcement learning agent, based at least in part on the second prediction time window and at least a portion of the first inventory data;
determine, using the reinforcement learning agent, based at least in part on second inventory data corresponding to at least a portion of the second prediction time window, a third prediction time window for the reinforcement learning agent; and
segment a second supply of inventory, using the reinforcement learning agent, based at least in part on the third prediction time window and at least a portion of the second inventory data.

10. The system of claim 9, wherein the at least one processor is further configured to execute the instructions to:
determine, based at least in part on a first weighted demand type value set and a first weighted supply type value set, a first inventory availability depletion rate set corresponding to at least the portion of the first prediction time window;
determine a first relative demand source priority set based at least in part on respective demand data corresponding to the first prediction time window;
determine a first performance benchmark set corresponding to how effectively at least one supply of inventory has been, using the reinforcement learning agent, segmented;
determine a first reinforcement learning reward for the reinforcement learning agent based at least in part on the first performance benchmark set and the first relative demand source priority set; and
segment the first supply of inventory, using the reinforcement learning agent, based at least in part on the second prediction time window, the first inventory availability depletion rate set, and the first relative demand source priority set.

11. The system of claim 10, wherein the at least one processor is further configured to execute the instructions to:
determine a second inventory availability depletion rate set corresponding to the second prediction time window;
determine a second relative demand source priority set based at least in part on respective demand data corresponding to the second prediction time window;
determine a second performance benchmark set corresponding to how effectively at least one supply of inventory has been, using the reinforcement learning agent, segmented;
determine a second reinforcement learning reward for the reinforcement learning agent based at least in part on the second performance benchmark set and the second relative demand source priority set; and
segment the second supply of inventory, using the reinforcement learning agent, based at least in part on the second inventory availability depletion rate set and the second relative demand source priority set.

12. The system of claim 11, wherein the at least one processor is further configured to execute the instructions to:
segment the first supply of inventory at, at least practically, an end of the first prediction time window;
coincide, at least practically, the end of the first prediction time window with a beginning of the second prediction time window; and
begin to determine the first inventory availability depletion rate set at an amount of time prior to the end of the first prediction time window.

13. The system of claim 12, wherein the amount of time is $1/15$ to $1/10$ as large as the first prediction time window.

14. The system of claim 13, wherein the at least one processor is further configured to execute the instructions to:
determine the first relative demand source priority set based at least in part on a plurality of weighted demand source values and a plurality of respective demand spike values.

15. A computer program product for machine learning dynamic inventory segmentation, the computer program product comprising a computer readable storage medium having program instructions embodied therewith, the program instructions executable by at least one processor to cause the at least one processor to:
determine, using a reinforcement learning agent, based at least in part on first inventory data corresponding to at least a portion of a first prediction time window for the reinforcement learning agent, a second prediction time window for the reinforcement learning agent;
segment a first supply of inventory, using the reinforcement learning agent, based at least in part on the second prediction time window and at least a portion of the first inventory data;
determine, using the reinforcement learning agent, based at least in part on second inventory data corresponding to at least a portion of the second prediction time window, a third prediction time window for the reinforcement learning agent; and segment a second supply of inventory, using the reinforcement learning agent, based at least in part on the third prediction time window and at least a portion of the second inventory data.

16. The computer program product of claim 15, wherein the program instructions are further executable by the at least one processor to cause the at least one processor to:
   determine, based at least in part on a first weighted demand type value set and a first weighted supply type value set, a first inventory availability depletion rate set corresponding to at least the portion of the first prediction time window;
   determine a first relative demand source priority set based at least in part on respective demand data corresponding to the first prediction time window;
   determine a first performance benchmark set corresponding to how effectively at least one supply of inventory has been, using the reinforcement learning agent, segmented;
   determine a first reinforcement learning reward for the reinforcement learning agent based at least in part on the first performance benchmark set and the first relative demand source priority set; and
   segment the first supply of inventory, using the reinforcement learning agent, based at least in part on the second prediction time window, the first inventory availability depletion rate set, and the first relative demand source priority set.

17. The computer program product of claim 16, wherein the program instructions are further executable by the at least one processor to cause the at least one processor to:
   determine a second inventory availability depletion rate set corresponding to the second prediction time window;
   determine a second relative demand source priority set based at least in part on respective demand data corresponding to the second prediction time window;
   determine a second performance benchmark set corresponding to how effectively at least one supply of inventory has been, using the reinforcement learning agent, segmented;
   determine a second reinforcement learning reward for the reinforcement learning agent based at least in part on the second performance benchmark set and the second relative demand source priority set; and
   segment the second supply of inventory, using the reinforcement learning agent, based at least in part on the second inventory availability depletion rate set and the second relative demand source priority set.

18. The computer program product of claim 17, wherein the program instructions are further executable by the at least one processor to cause the at least one processor to:
   segment the first supply of inventory at, at least practically, an end of the first prediction time window;
   coincide, at least practically, the end of the first prediction time window with a beginning of the second prediction time window; and
   begin to determine the first inventory availability depletion rate set at an amount of time prior to the end of the first prediction time window.

19. The computer program product of claim 18, wherein the amount of time is $1/15$ to $1/10$ as large as the first prediction time window.

20. The computer program product of claim 19, wherein the program instructions are further executable by the at least one processor to cause the at least one processor to:
   determine the first relative demand source priority set based at least in part on a plurality of weighted demand source values and a plurality of respective demand spike values.

* * * * *